Oct. 13, 1931. C. G. WILSON 1,826,975
APPARATUS FOR SUPPLYING AIR UNDER PRESSURE
Filed July 27, 1928
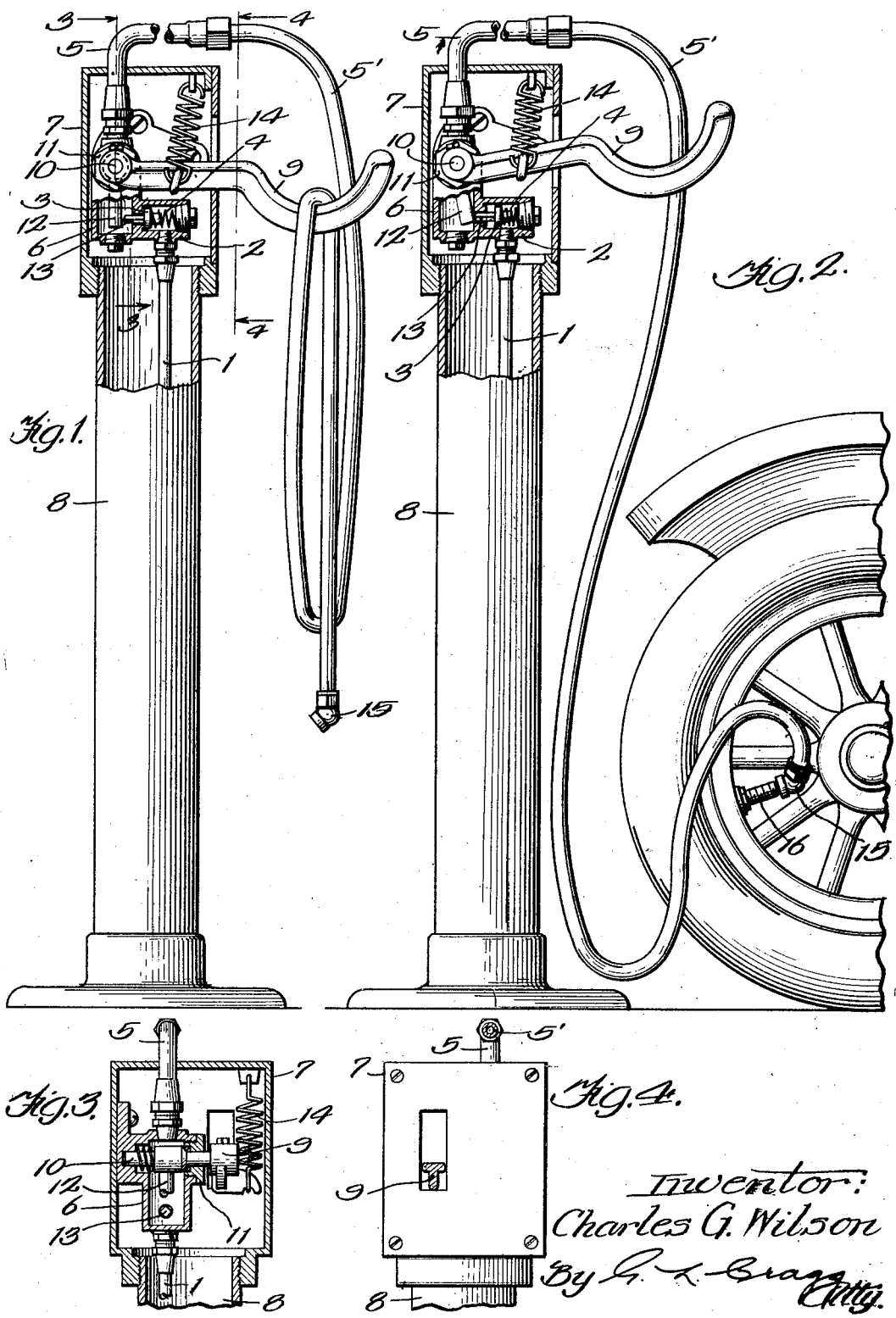

Patented Oct. 13, 1931

1,826,975

UNITED STATES PATENT OFFICE

CHARLES G. WILSON, OF BRYAN, OHIO, ASSIGNOR TO SERVICE STATION EQUIPMENT COMPANY, OF BRYAN, OHIO, A CORPORATION OF DELAWARE

APPARATUS FOR SUPPLYING AIR UNDER PRESSURE

Application filed July 27, 1928. Serial No. 295,792.

My invention relates to apparatus for supplying air under pressure through shiftable delivery piping to receivers such as pneumatic tires of vehicle wheels. Generally speaking, the invention resides in the provision of mechanism controlled by the piping and governing a valve in a manner to open the valve when the piping is taken for use and to close the valve when the piping is released.

In the preferred embodiment of the invention, I employ a suitable support for the discharge piping, this support being in the form of a bell crank lever having one arm in supporting relation to the discharge piping and its other arm in opening engagement with the valve when the support is relieved of the weight of the discharge piping, the valve being supplied with means for closing it when the bell crank is moved by the discharge piping when supported thereon. The portion of the discharge piping which is hung upon the bell crank lever is usually in the form of a flexible hose having a valved chuck at its discharge end. By means of the invention, leakage at the chuck is avoided, when the hose is not in use. Signal bells are usually employed to indicate when a predetermined quantity of air has been passed through the piping. Untimely and improper operation of these bells is prevented by means of my improved mechanism. Improper operation of automatically operating valve controlling mechanism, if such be employed, is also avoided.

The invention will be more fully explained in connection with the accompanying drawings in which Fig. 1 is a side elevation with portions broken away and shown in section, the discharge hose being shown out of use and upon one arm of the bell crank lever to permit the valve to be closed; Fig. 2 is a view similar to Fig. 1 but showing the bell crank lever relieved of the weight of the discharge hose which is shown connected with a pneumatic tire; Fig. 3 is a sectional view on line 3—3 of Fig. 1; and Fig. 4 is a sectional view on line 4—4 of Fig. 1.

The source of air under pressure in inclusive of a pipe 1 that extends from an air pressure tank and which terminates, at its upper end, in a valve chamber 2. A valve 3 is normally pressed against its seat by a spring 4, the valve being thus normally closed. The piping 5 to which the air is supplied under pressure is connected at its lower end with the chamber 6 that is formed by a continuation of the valve casing 2 and which is normally shut off from the interior of this valve casing by the valve 3. A box 7 encloses the valve structure and parts that govern the same. The box is mounted, preferably fixedly, upon a hollow pedestal 8 through which the pipe 1 passes downwardly into connection with the air pressure tank that may be in the ground.

The valve controlling bell crank lever has one arm 9 fixed upon a shaft 10 which is journaled at one end in the body of the chamber 6 and at its other end in a closure plug 11 which is provided for this chamber. The other arm 12 of the bell crank lever is also fixed upon said shaft and has a range of movement enabling it to be brought into and out of engagement with the stem 13 of the valve 3. When the flexible hose section 5' of the discharge piping is out of use, it is hung upon the bell crank arm 9, the weight of the hose turning the bell crank lever in a clockwise direction to move the bell crank arm 12 away from the stem 13 to permit the spring 4 to close the valve. When the hose 5' is taken for use, it is lifted from the bell crank arm 9, the spring 14 then being free to function to move the bell crank lever in a counterclockwise direction to operatively engage the bell crank arm 12 with the stem 13 which is moved by this bell crank arm in a valve opening direction against the force of the spring 4. It is understood that the spring 14 is not strong enough to overcome the weight of the hose when it is carried by the bell crank lever so that the hose is then able to move the bell crank lever clockwise and out of opening relation to the valve.

The discharging piping is usually provided with a valve chuck 15 at its discharge end which may be coupled with the nipple 16 of a pneumatic tire in a manner known and as illustrated in Fig. 2. The invention, however, is not to be limited to the employment of such a valve chuck. By means of the structure of my invention, air is only permitted to flow through the piping when the discharge hose is taken for use, the flow of air being cut off when the air hose is not in service and is carried by the bell crank lever with the advantages which have been set forth and with other advantages which may be attendant.

Changes may be made without departing from the invention.

Having thus described my invention, I claim:

The combination with a source of air under pressure, of discharge piping shiftable into usable and restored positions, a movable support for the discharge piping and placed in one position by the piping when carried thereon and supplied with means for moving it to an alternative position when relieved of the weight of said piping, a valve casing, a packed shaft extending therefrom, said movable support being secured to said shaft outside of said valve casing for movement with the shaft, an arm extending from said shaft inside said valve casing, an air receiving cavity within said valve casing and around said arm and communicating with said discharge piping, an air supply cavity, a wall separating said air supply cavity from said air receiving cavity, a valve stem through said wall and adapted to be engaged by said arm and a valve member on said stem in said air supply cavity for engaging said wall for controlling the passage of air therethrough from said air supply cavity to said air receiving cavity.

In witness whereof, I hereunto subscribe my name.

CHARLES G. WILSON.